United States Patent
Levis et al.

[11] Patent Number: 5,902,033
[45] Date of Patent: May 11, 1999

[54] PROJECTOR SYSTEM WITH HOLLOW LIGHT PIPE OPTICS

[75] Inventors: Maurice E. Levis, Hampton, Va.; Helen Gourley, San Francisco, Calif.

[73] Assignee: Torch Technologies LLC, Hampton, Va.

[21] Appl. No.: 09/131,267

[22] Filed: Aug. 7, 1998

Related U.S. Application Data

[63] Continuation-in-part of application No. 08/801,438, Feb. 18, 1997, abandoned, and application No. 08/829,199, Mar. 31, 1997, Pat. No. 5,829,858.

[51] Int. Cl.$^6$ .................................................. G03B 21/14
[52] U.S. Cl. ........................... 353/122; 353/98; 385/146; 359/894
[58] Field of Search .............................. 353/38, 99, 122; 359/894, 900, 503; 385/146, 132, 131, 130, 147, 48, 123, 133; 362/307, 308, 311, 326, 327, 328, 339, 268, 32

[56] References Cited

U.S. PATENT DOCUMENTS

| | | | |
|---|---|---|---|
| 3,170,980 | 2/1965 | Pritchard . | |
| 3,740,112 | 6/1973 | Lundgren | 385/133 |
| 3,832,029 | 8/1974 | Bryngdahl | 385/133 |
| 3,913,872 | 10/1975 | Weber | 355/67 |
| 4,813,765 | 3/1989 | Negishi . | |
| 5,059,013 | 10/1991 | Jain | 359/503 |
| 5,146,248 | 9/1992 | Duwaer et al. | 353/98 |
| 5,625,738 | 4/1997 | Magarill | 385/146 |
| 5,634,704 | 6/1997 | Shikama et al. | 353/31 |
| 5,748,376 | 5/1998 | Lin et al. | 349/5 |
| 5,777,789 | 7/1998 | Chiu et al. | 353/34 |
| 5,784,517 | 7/1998 | Johanson | 385/133 |

*Primary Examiner*—William C. Dowling
*Attorney, Agent, or Firm*—Eliot S. Gerber

[57] ABSTRACT

A projector system includes a light pipe integrator (LPI) between its lamp and its projection lens system. The LPI is hollow, formed from sheet metal, and has an internal cold mirror coating which reflects visible light and passes infrared radiation. The reflector is a compound reflector having profiles of two ellipses with different eccentricities.

24 Claims, 6 Drawing Sheets

PROJECTOR SYSTEM WITH HOLLOW LIGHT PIPE OPTICS

RELATED APPLICATIONS

This application is a continuation-in-part application based upon Ser. No. 08/801,438, filed Feb. 18, 1997, now abandoned; Ser. No. 08/829,199, filed Mar. 31, 1997, now U.S. Pat. No. 5,829,858; the priority dates of both applications being claimed herein; and is related to Ser. No. 09/127,594, filed Jul. 31, 1998, now pending, entitled "LCD Projection System With Polarization Doubler."

FIELD OF THE INVENTION

The present invention relates to optics and more particularly to the light engine of an optical projector system.

BACKGROUND OF THE INVENTION

At the present time optical projector systems are widely used in business, educational and consumer applications. For example, slide and motion picture projectors are used to show images from film on screens; projection TV may use one or three LCD panels (Liquid Crystal Display), (LCLV-Liquid Crystal Light Valve) and other projectors may use a computer-controlled LCD. The light for projector systems is provided by a "light engine" which generally consists of a light source, for example, a light bulb, a reflector and one or more lenses to direct the light on the "image gate" such as an LCD panel or film gate. In general it is desirable that the light engine have the following characteristics: (1) the light it provides should be bright; (2) the light engine should not produce heat in excess of its ability to be cooled, for example, by a fan, in order to conserve the life of its bulb and other components; (3) it should produce white light without color spots, which is especially a problem in metal halide arc lamps; (3) the light should be spread evenly over the image gate. Often, in commercial light engines, the light in the center may be at 100% but the light in the four corners may be less than 50%; and (4) the light engine should be physically as small and as low in cost as feasible.

This is an old and crowded field of technology. Hundreds, and possibly thousands, of patents and articles have been written and many types of light engines have been commercially produced. Nevertheless, there still exists the need for an improved light engine for projector systems. Such an improved light engine would spread the light evenly so that the light in the corners of a rectangular image gate ("corner illuminance") is at least 70% of the light at the gate's center; the colors from the lamp are homogenized to produce uniform white light without color spots; and there is reduced wasted light due to "spillage" (light beams which fall outside of the image gate).

In the article "An Uniform Rectangular Illuminating Optical System For Liquid Crystal Light Valve Projectors", Chang et al, *Eurodisplay*, '96, pgs. 256–260, light from a short arc lamp is gathered by an elliptical reflector and transmitted through a solid glass RPGR (Rectangular Pillar-Like Glass Rod) and then through two lenses to a LCLV (Liquid Crystal Light Valve).

In addition, a number of other articles and patents have described solid glass, plastic or dielectric filled light pipes for projection systems including U.S. Pat. Nos. 5,146,248 (column 6, lines 35–51 ); 4,813,765 (column 1, lines 40–42); 5,696,865 (column 4, lines 61–65); and 5,634,704 (column 8, lines 55–58).

A solid light pipe, when used in a projection system to transmit light from a light source to an image gate, presents a number of problems. If the light source produces a large amount of heat, such as an arc lamp, the light pipe may have to be made of Pyrex (TM of Corning) or other high temperature resistant (low thermal expansion) glass. However, the light transmission of such high temperature glass is poor compared to regular optical glass, and consequently light would be lost and the efficiency of transmission of light would be unsatisfactory. In addition, although optical glass or optical plastic appears clear and unblemished to the naked eye, it generally has microscopic sized bubbles and lines. Those microscopic sized imperfections cause an unpredictable and undesirable color shift in the transmitted light.

It may be difficult, or impossible, to meet a typical specification for color uniformity of ±200° K. due to color shifts caused by the non-homogeneous solid transparent material of the light pipe. Furthermore, a solid light pipe, especially if made from glass, adds to the weight and expense of the light engine. It requires special mounting, for example, by screws having pointed ends, and the mounting may be delicate and expensive.

U.S. Pat. No. 3,774,995 (Class 359–869) discloses a reflector having sections of the surface with different curvatures, including an ellipse.

SUMMARY OF THE INVENTION

In accordance with the present invention there is provided a novel and improved light engine for projector systems. The projector system may include the following conventional portions: a light source, such as an arc lamp, a reflector, relay optics such as one or more lenses, an image gate such as a film gate, and a projector lens alone or with field optics. The light engine includes the lamp, reflector and relay optics. In addition, the present invention provides a novel collector-reflector assembly which forms the light from the reflector into a cone, instead of another beam shape, and a tapered light pipe LPI (Light Pipe Integrator). The collector optic is a reflector formed as a continuous mirror curved surface. That surface comprises two, or more, ellipses having different eccentricities (e) and focal points (F). The ellipses are cross-sections in planes through the reflector's optical axis; but cross-sections of the reflector perpendicular to its optical axis are circles. The truncated end of the light cone is positioned on the entrance pupil of the light pipe. The relay optics are positioned between the exit pupil (exit face) of the light pipe and the image gate. In some embodiments the relay optics may be omitted and the exit pupil may be positioned directly proximate the image gate.

The light pipe integrator (LPI) functions on the principle of internal reflection. It is hollow with mirror interior walls (internal reflection) and is not a solid piece of glass or other transparent material (total internal reflection). The interior walls of the LPI are coated with a "cold mirror coating." That coating is reflective (mirror) to visible light but passes IR (Infra Red) light; which is undesirable heat. The LPI is preferably formed of flat sheets of metal, and less preferably of Pyrex (TM of Corning) or other heat resistive low thermal expansion glass. The flat sheets permit an even high-quality cold mirror coating, which is expensive or impossible on a curved surface. The light pipe provides color uniformity which has been measured at ±50K.

The entrance pupil (entrance face) of the light pipe receives a conical beam from the collection optic (reflector). The entrance pupil is flat (perpendicular to the optical axis) and octagonal or square to best match the truncated cone shape of the light beam. The term "profile" means in a plane through the optical axis and the term "cross-section" means in a plane perpendicular to the optical axis. The exit pupil (exit face) of the light pipe is flat in cross-section. Various aspect ratios may be utilized, such as HDTV's (High Definition Television) image gate aspect ratio of 9:16.

The light pipe integrator integrates the colors from the arc lamp and produces a homogenized, uniform color temperature for white light at its exit pupil. The light pipe also provides a rectangular exit face that may directly fit the image gate or a Polarizing Beam Splitter (PBS) (aspect ratio and shape), thus substantially reducing the amount of light lost in spillage. The light pipe gives an excellent distribution of light over the input face of the image gate or PBS. The light engine consequently produces a beam at the image gate, easily resulting in corner illuminance (ANSI) of 70% of center, which is a major image quality enhancement over presently commercially available light engines. The light pipe, and the multi-ellipse reflector (collector optic), called "VAREX" (TM of Torch Technologies LLC), improves color uniformity, light uniformity and collection efficiency.

The cone angle distribution ("angle population") of the incoming light cone from the light source sets the cone angle distribution of the outgoing cone. It is desirable that the outgoing beam cone angle population be reduced. The goal is to match the required angle population of the image gate, i.e., the LCD. The preferred shape of the light pipe (LPI) is composed of an entrance tapered section, a narrow center section and an exit tapered section. The wide part of the taper of the exit tapered section is toward the PBS or image gate. The entry tapered section has the wide part of the taper facing the light source. The cone increases angle population and the taper reduces it. The resulting change in angle population is the net effect of the two parts—usually a reduction in angle population. Such a double tapered light pipe reduces the geometric extent, which results in the reduction of the physical length of the light engine.

A preferred embodiment of a light pipe LPI is a hollow light pipe with a two tapered section shape, an entry pupil, a center section, which is octagonal or square in cross-section, and a flat rectangular exit pupil.

BRIEF DESCRIPTION OF THE DRAWINGS

In the accompanying drawings of the present invention, the figures are described as follows.

DETAILED DESCRIPTION

Figure 1:
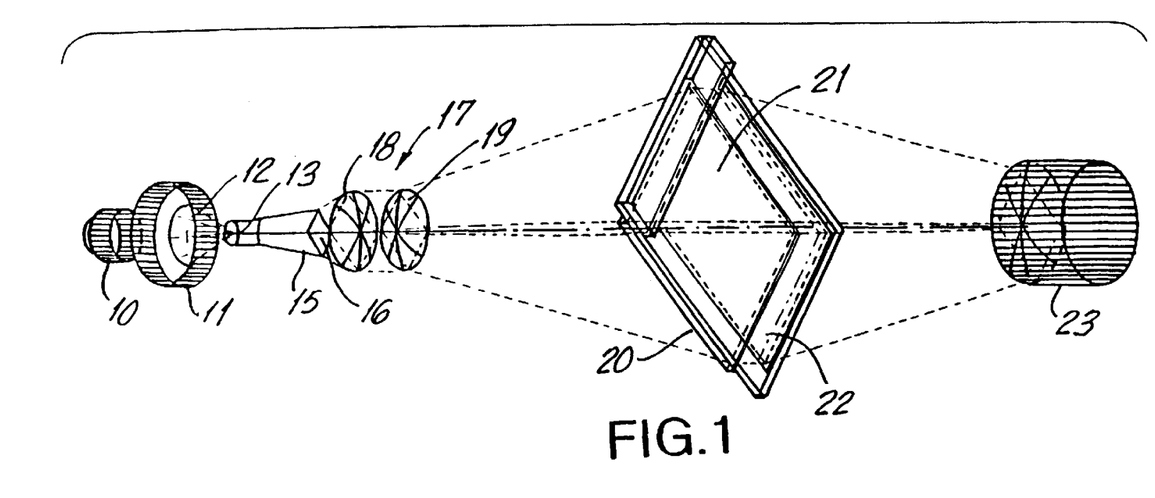
FIG. 1 is a perspective view of the projector system of the present invention.
Figure 2:
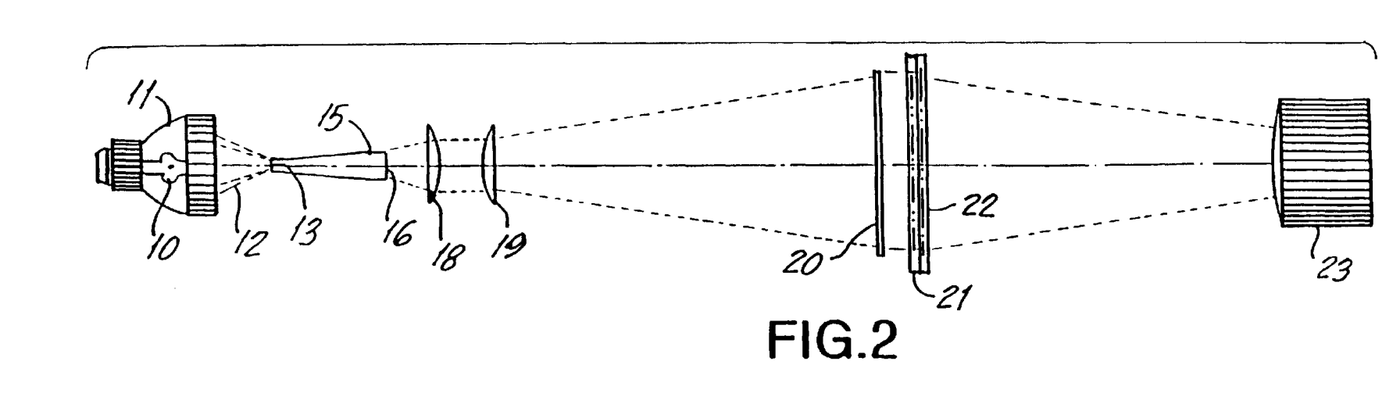
FIG. 2 is a top view of the projector system of FIG. 1.

As shown in FIG. 1, the first embodiment of the light engine of the present invention is used in an LCD (Liquid Crystal Display) projector system. That projector system includes an arc lamp 10 and reflector 11. The reflector 11 (collector assembly or collector optic) forms the light into a conical beam 12 (cone) having a peak (tip) 13. The beam is directed so that the cone peak 13 falls within the entrance pupil 14 (entrance face) of a light pipe 15—LPI (Light Pipe Integrator). The light exits from the exit pupil 16 (exit face) of the LPI 15 and is transmitted through the relay optics 17 consisting of first plano-convex lens 18 and second plano-concave lens 19. In some cases a field lens is used between the image gate and the projection lens. Those components form the light engine.

The relay optics 17 direct the beam onto the image gate (entry face) of an LCD panel 21. The LCD panel 21 is preceded in the optical path by a Fresnel lens 20 (Fresnel lens sheet) and is followed by a second Fresnel lens 22. A projection lens 23 focuses the image from LCD panel 21 onto a screen (not shown). A "Fresnel lens" is a plate having concentric grooves (about 40–300 grooves per inch) which is molded as a thin plastic sheet and replaces the curved surface of a conventional lens.

A light pipe LPI is an elongated optical element having an entrance pupil, reflecting internal walls and an exit pupil. Light entering the entrance pupil is internally reflected to become homogenized (mixed). The light pipe (LPI—Light Pipe Integrator) is hollow with internal mirror walls. The entrance pupil 13 is preferably octagonal or square in a cross-section perpendicular to the optical axis to accord with the shape of the light beam cone. The light pipe exit pupil 16 is flat and rectangular and the width of, and having the same aspect ratio as, the image gate 6, typically 4:3 for LCD panels.

Preferably the light pipe section closest to the LCD panel is tapered so that the exit pupil is at least 50% larger (in area) than the center section of the light pipe and the light pipe becomes larger (in cross-sections) perpendicular to its optical axis) towards its exit pupil, i.e., toward the LCD plate. This tapered shape permits an efficient transmittal of the light without wasting light, due to spillage, at the LCD plate. Preferably the ratio of the entrance pupil area to exit area pupil area to the central section is in the range of 1.5:1 to 5:1 and most preferably in the range of 2:1 to 4:1. Preferably the cross-sectional area of the exit pupil is at least 50% greater than the cross-sectional area of the center section.

Hollow LPIs are preferred to solid transparent LPIs for a number of reasons. Costs are reduced because the hollow LPI may use flat, reflective coated material that is mechanically easy to assemble and integrate into the "light engine" system. There are no problems with entrance and exit pupil losses (no AR anti-reflective coatings needed), or heating of the glass substrate.

Preferably highly polished sheet metal, such as copper or nickel alloys, is used as a reflector substrate (the base for the internal reflective coating). The light travels through empty air space, thus no scattering or other interference occurs.

The internal reflective coating is preferably a cold mirror coating to remove IR (Infra Red) heat from the light beam. The removal of IR heat radiation from the beam of light, without the addition of transmissive heat filters that reduce substantially the visible light in the beam, is a major advantage of the present invention. The LPI is formed from flat sheets of metal having a cold mirror coating on its internal surface. Such coatings are more difficult and expensive to apply to a curved substrate (curved metal or glass base).

An LPI has been fabricated and tested using a cold mirror coating (HR98A) manufactured by Optical Coating Laboratories Inc. (OCLI) of Santa Rosa, Calif., on glass. It has a reflectivity of 98.5% average over the visible spectrum (compared to the expected TIR (Total Internal Reflection) of 99.5%). The beam of light incident on the cold mirror coating will create a heat loading at the initial point of incidence. If enough heat is generated locally, and a very intense and concentrated beam of light is used at the light pipe entry, the cold mirror coating can be stripped and degraded if the substrate is glass. The glass substrate is not a good heat conductor to carry away the local heat to prevent damage to the cold mirror coating. The preferred device uses a metal light pipe coated inside with a metal cold mirror coating. The infrared radiation passing through the cold mirror coating will be absorbed into the metal substrate and will heat up the metal wall. The metal substrate will act as a heat sink, carrying the heat away from any specific spot and distributing it over the entire substrate.

Cold mirror coatings are typically used in flat mirrors and are designed for a specific angle of incidence (such as normal or 45 degrees). There is a color shift in the reflected light if the incident light is more than +/−15 degrees off from the design angle for the coating. The cold mirror coating (a multilayer or dielectric coating) in an LPI makes the angle of incidence dependence of the coating not critical. One of the major properties of the LPI is the "homogenizing" of the colors within the LPI, so by the time the beam exits from the LPI the various colors are well mixed and color uniformity is excellent.

A preferred LPI configuration is a hollow LPI using highly reflective cold mirror coatings on its internal walls deposited on a substrate of sheet metal, such as polished copper or nickel alloys. An alternative is a low expansion glass substrate (heat resistant glass) which is a flat sheet of plate glass, as it is difficult to coat curved glass. Such a low thermal expansion glass is typically made by adding boron oxide to silicate glass to produce "borosilicate" glass such as Pyrex (TM of Corning). A preferred coating is a cold mirror coating ("cold mirror coating means") that allows the infrared (IR) light, e.g., heat rays (IR) to be transmitted, while reflecting the visible rays (visible light). Such a coating is the OCLI HR98C coating (TM of OCLI, Santa Rosa, Calif.), made of layers of thin film dielectric material with a reflectivity in the visible part of the spectrum an average of higher than 98%.

The HR98C of OCLI (Optical Coating Laboratory, Inc.) will pass infrared, at least 90% above 700 nm and has reflectivity of between 97% and 99.8% between 425 nm–700 nm and with a minimum phototopic average of 98% at 45 degrees.

A suitable cold mirror coating will transmit 90% of the IR light and reflect at least 98% of the visible light. A ray having both IR and visible light and which is reflected twice in the light pipe will lose at least 99% of its IR heat and be reflected with a loss of less than 4% of visible light.

Figure 7:
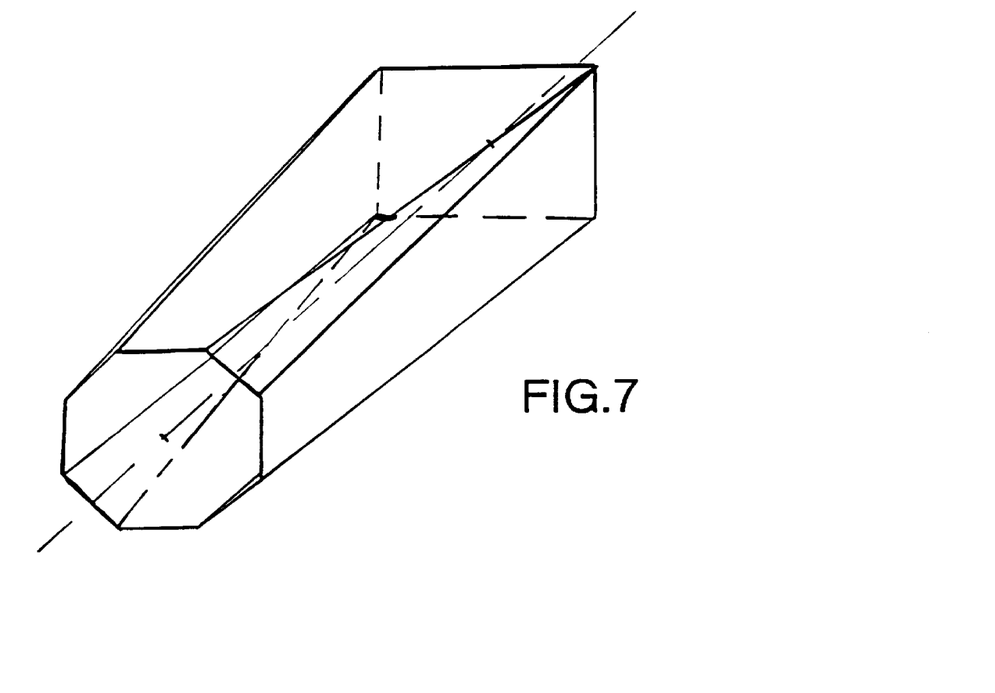
FIG. 7 is a perspective view of a tapered hollow LPI having an octagonal entry pupil and a rectangular exit pupil.

A preferred hollow LPI shape has an octagonal and flat (cross-section) entrance pupil, with a tapered first section ending in a square (cross-section). That square is attached to a second section (center section) with a rectangular exit cross section (14 mm×14 mm) and a larger exit pupil cross section (exit section) to match the shape of the PBS or image gate, as shown in FIG. 7. The overall length is 106 mm and the entrance pupil is 28 mm in diameter and the exit pupil is 18 mm high and 24 mm wide.

Figure 3:
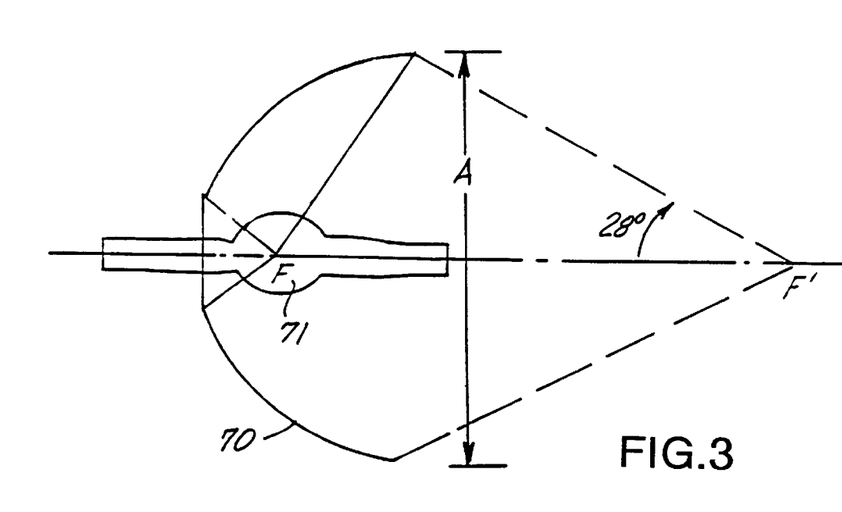
FIG. 3 is a side cross-sectional view of a lamp and reflector.

A preferred arc lamp bulb and its reflector is shown in FIG. 3. The reflector 70 (collector optic) is metal with a mirror interior finish and is elliptical in shape (17.27 mm F (center), e=0.746. The preferred reflector is a tilted ellipse. The profile is two elliptical sections that do not necessarily form a single ellipse. The lamp bulb 71 is a plasma arc bulb, for example, type HTI404W/SE by OSRAM. The light source may be a xenon arc lamp or an incandescent source such as a halogen lamp. The reflector diameter "A" is 3.250 inches (82.55 cm).

Figure 4:
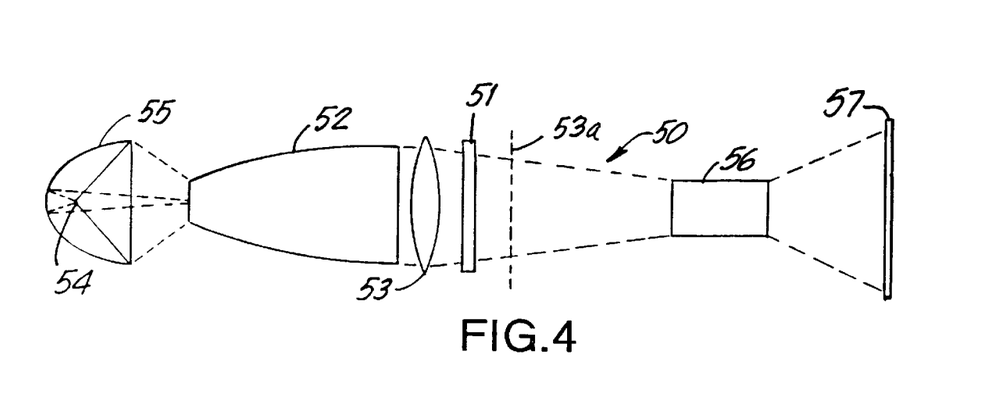
FIG. 4 is a side view of another embodiment of a projector system of the present invention.
Figure 5:
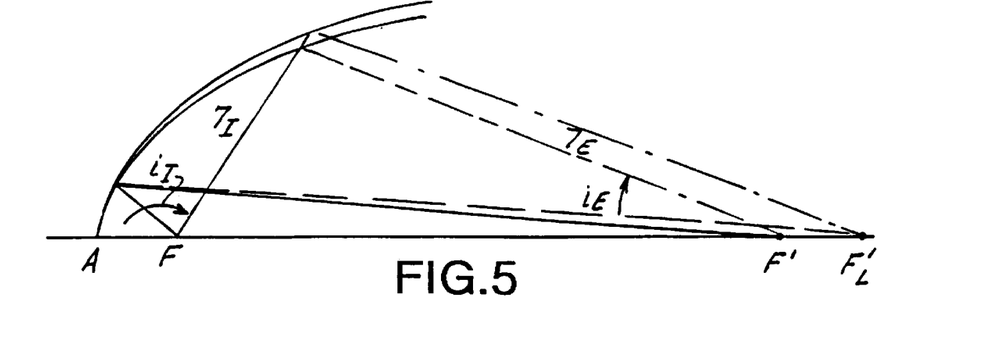
FIG. 5 is a polar coordinate system showing two collector optics (reflector) for elliptical conic sections having the same focus F but different eccentricities (solid and dash-dash line). The second focal points are F' and $F_1'$.

The embodiment of FIG. 4 shows a configuration of the light engine 50, but the relay lens component is eliminated. The LCD panel 51 is placed at the exit pupil of the light pipe 52 with a field lens 53 between the light pipe and the panel. A field lens could also be positioned in position 53a, following the image gate, or two field lenses could be used one in position 53 and one in position 53a. The design of the projection lens 56 will have to match the choice of the field optics. In this configuration, the light pipe exit pupil is of the same general size as the image gate, i.e., a film gate or an LCD panel. The plasma arc lamp 54 and reflector/collector 55 may be of the type of FIG. 6. The system also includes a conventional projector lens 56 and screen 57. This configuration is effective for smaller image apertures, under three inches in diagonal. The elimination of the relay optics results in tighter packaging (shorter length) for the projector. There is a substantial reduction in the length of the light path.

Although the description set forth above is in connection with an LCD panel, the invention is also applicable to film projection systems. The following light engine may be used in a film projection system: a light engine comprised of (a) a plasma arc lamp (or halogen lamp), (b) a collector optic, (c) a light pipe integrator, (d) relay optics, (e) field optics, (f) a slide projector film gate or a motion picture projection film gate or an overhead projector stage, and (g) a projection lens.

The relay optics 17, shown in FIG. 1, images the exit pupil 16 of the light pipe onto the plane of the image gate, i.e., the LCD light valve. The choice of the relay optics is such that the proper magnification is achieved at the desired distance. The chosen distance is such that the appropriate beam divergence is achieved at the image gate.

The field optics are designed to direct the light beam through the image gate and into the entrance pupil of the projection lens at the proper cone angle and size. In FIG. 1 two Fresnel lenses are used. The first Fresnel lens 20 collimates the light entering the image gate and the second 21 condenses the light leaving the image gate. For large aperture panels where glass lenses are not practical, Fresnel lenses are used. For smaller apertures glass lenses can be used to achieve the same goals with lower transmissive loss of light.

In the example of FIG. 1 the light modulator panel 21 is a transmissive LCD panel. It is the center piece of the design since it has certain properties that are fixed and have to be accommodated by the design of the light engine. The light must be distributed evenly over the aperture. The angle of incidence of the light beam on the LCD panel 21 is critical because the image contrast and contrast uniformity are very sensitive to that angle. In most cases the required beam angle is in the range of 5 to 6 degrees, setting the system speed at an f/4.0 to an f/5.0. In practice, angles of up to 10 degrees yield acceptable image quality. All other practical elements must be designed to accommodate these requirements. The angle at which the light valve is positioned relative to the projected image is also vertical for contrast and contrast uniformity.

The projection lens 23 is designed to meet certain system requirements. The acceptance cone angle, field angle, f# (f stop number) and focal length must be chosen to accommodate system restrictions and requirements. Part of these requirements that affect the chosen focal length relate to desired throw distance/image size ratio that also depends on the size of the image generated by the LCD panel. The projection lens must have sufficient resolution to resolve the LCD pixels and otherwise preserve image fidelity. The projection lens 23 should be free of distortions and may have to be of a telecentric design.

The shape of the reflector (concave mirror) which gathers the light from the lamp and directs it at the entry pupil of the light pipe is preferably curved with two elliptical sections. It is a concave reflector whose back end (closed end) is formed as an ellipse having a first eccentricity and secondary focal point $F_1'$ and whose front end (open end) is an ellipse having a second (and different) eccentricity and a secondary focal point $F_2'$. This variable ellipse reflector does not form a sharp image (point or line focus) at a focal point, since it is not used to form an image. Instead, it forms a fuzzy ball of light located at, or within, the entrance pupil of the tapered light pipe. The internal mirrored reflecting surface is a nonspherical continuously curved surface having two, or more, different generators of curvature (preferably ellipses) and in which the cross-sections are circular (perpendicular to the optical axis of the cone of light).

Two of the critical elements of the light engine are the LPI (Light Pipe Integrator) and the collector (reflector)-"collector optic." Matching these two optical elements for optimum performance is extremely important and is discussed in Ser. No. 08/829,199, U.S. Pat. No. 5,829,858, incorporated by reference.

Figure 6:
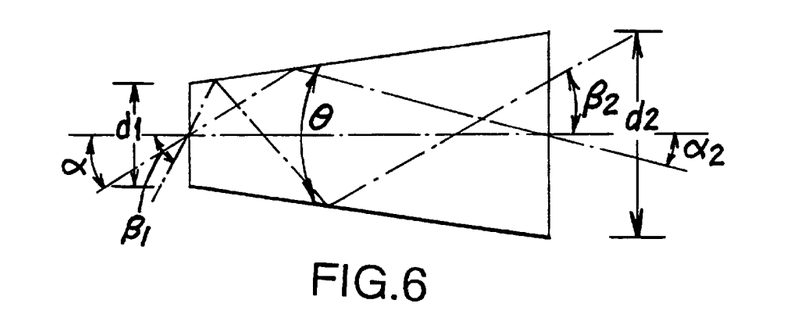
FIG. 6 is a simplified cross-sectional diagram of the tapered light pipe of the present invention (hollow) having circular cross-sections.

A tapered LPI is shown in FIG. 6 with the wider portion toward the film gate. Principal rays coming in at the entry pupil α1, (smaller end) exit at the exit pupil (larger end) at a smaller angle α2. The angle of the incident ray (e.g. a or b) is changed each time it is reflected from the wall of the LPI by (theta). The tapered light pipe is used to change the f# of the incident beam to a larger f#, thus reducing the angle population maximum value at the exit of the light pipe. This is an important advantage of the tapered LPI.

The following conclusions have been found:
1. The incoming light cone from the elliptical collector optic scans a range of convergence angles, from about 6 to 45 degrees, and has a variety of spot sizes. The LPI optic recognizes and deals with this variation through an optimization decision process. Preferably the LPI optic uses double-taper sections. The larger entry pupil, due to the entry section taper, enables the LPI to gather the larger spots (at the lower angles) while not adversely affecting the smaller spots (at the higher angles). The double taper, shown in FIG. 7, is called "V-BLOCK" or "V-8" (TM, Torch Technologies).
2. One of the functions of the LPI is to integrate the incoming light beam in terms of color and light distribution at the exit pupil of the light pipe. This is the mixing function. In order to do this function, a number of reflections must occur inside the light pipe, both for the smallest and largest incident angles. Because of this mixing function, the internal walls of the light pipe can be curved. Generally the cold mirror coating can only be applied to a flat surface with sufficient accuracy to reflect visible light without color shifts. However, the cold mirror coating may be applied to inner curved walls, resulting in color shifts on reflection. Those color shifts are acceptable due to the color mixing of the light pipe.

The LPI also performs a beam shaping function. The output LPI cross-section (exit pupil) should be the same shape and aspect ratio as the aperture (image gate) or PBS to be illuminated. The entry pupil of the LPI is best fitted to a round cross-section incoming beam, i.e., a conical beam.

The LPI changes the f# of the cone angle of the angle population between the incoming beam and of the outgoing beam. The "angle population" is the percent of total beam per angle increment, i.e., if the light is 80% at angles less than 6 degrees it has a low angle population. This function, of changing the angle population, is performed by the tapered geometry of the LPI. This is important because the LCD panel angle population acceptance angle is rather limited (under 10 degrees). The tapered shape of the LPI reduces the maximum angle of the incoming angle population and produces an outgoing light beam having a low angle population (at least 80% is under 10 degrees).

The desired goals of the LPI based light engine are to provide the maximum possible amount of light that can be collected from the arc lamp through the image gate (open aperture where the LCD panel is located) at the proper angle population. The angle population should be limited to ±15 degrees, and is preferably within ±10 degrees, and is most preferably ±6 degrees.

The preferred collector optical element uses an ellipse in the eccentricity range between e=0.65 and e=0.75 in conjunction with a light source 3 mm long (the arc gap is 3 mm). This range of eccentricities provides small spots and relatively large convergence cone angles. The higher eccentricity end (e=0.75) is dictated by the magnification that can be tolerated (arc gap 3 mm). For example, at a collection angle i(I) of 40 degrees the magnification at e=0.75 is approximately X6. A 3 mm arc gap will be imaged into an 18 mm spot. At e=0.60, it will be imaged into an 11 mm spot. The maximum angle of convergence for e=0.75 is 28 degrees and for an e=0.65 it is 41 degrees. The maximum of the converging angle is dictated by the number of reflections in the light pipe one can tolerate (the sharper the angle the more the number of reflections).

One of the problems with the tapered LPI, and other LPIs, is that some of the small angles coming into the LPI will not reflect even once and go through unmixed. This adversely affects the color uniformity and the light distribution on the screen. For this reason, and to optimize the LPI performance, one LPI configuration that optimizes the LPI functions is as shown in FIG. 7. The light pipe mixing section should be long enough and with a cross-section small enough where the lowest converging angle of the entrance beam can get at least one reflection inside. One preferred transition shape for the mixing section of the LPI or, for that matter, for an LPI consisting solely of a tapered section, starts with an octagonal LPI entrance cross-section. The octagonal cross-section makes a smooth transition with a rectangular LPI exit cross-section, as shown in FIG. 7. This transition geometry is most suitable in developing good corner coverage for the light distribution on the screen.

Figure 8:
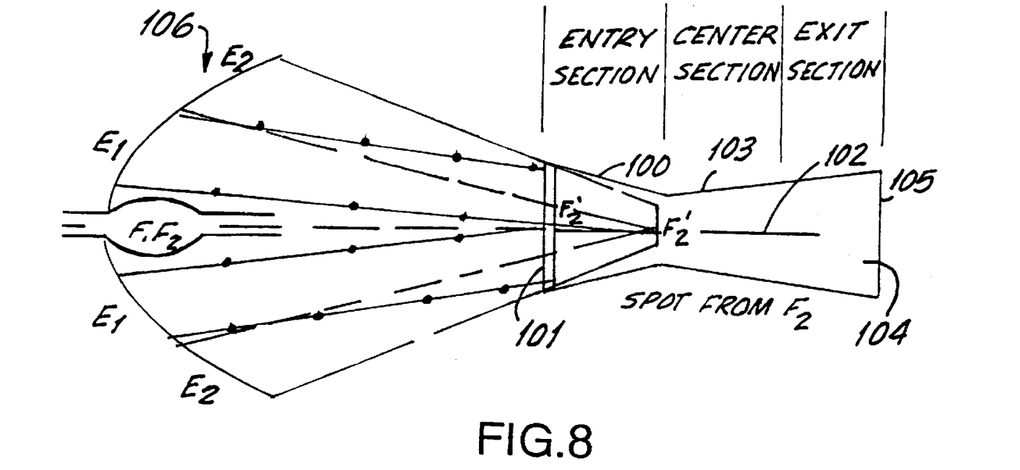
FIG. 8 is a side cross-sectional view of a double-tapered LPI.

Preferably a hollow "V-BLOCK" (V-8 INTEGRATOR—TM of Torch Technologies LLC) LPI is used having an entrance tapered section and an exit tapered section, see FIG. 8. That device can accommodate both the generated spot size and its cone angle population. The entry tapered section (the entry pupil) collects all the light from the incoming beam. The embodiment of FIG. 8 preferably is used in the "VAREX" (TM) reflector having a variable elliptical eccentricity and two, or more, focal points.

Once one has chosen a lamp and an image gate, such as a LCD panel, that determines the size of the arc gap and the size of the panel. These two parameters essentially set the limits of the accommodation one can make between spot size and convergence angle population for the elliptical collector and the LPI. The choice of the eccentricity of the elliptical collector element sets the values for the maximum cone angle of the convergent spot and the maximum magnification of the 40 degree collection angle at the back of the collector. A parameter of importance to metal halide arc lamps in particular is the power at the lamp vs. the gap size required. The VIP R 270 (270 watts), for example, with a gap of 1.6 mm, generates only 15000 lumens. The HTI 250 (270 watts) with a gap of 2.4 mm, generates 20000 lumens. The HTI 404 (400 watts), with a gap of 3.0 mm, generates 30000 lumens. The HTI 600 (600 watts), with a gap of 5.5 mm, generates 45000 lumens. The arc gap is in the range of 1 to 6 mm. This means that a VIP R 270 may direct more light through a 3.3" panel than the HTI 600 (600 watts) in spite of the fact that it generates only one-third of the lumens of the HTI 600, due to the geometric factors involved.

One of the limits imposed on the optimization between light source and image aperture is due to the elliptical collector that is defined in terms of a single eccentricity. This is a severe limitation because once one selects the eccentricity, it determines a specific value of the maximum convergent cone angle and the maximum magnification for the spot. The present invention provides a design of elliptical collectors with variable eccentricity. It is desirable to keep the eccentricity of the back rays collected around the 40 degree collection angle at a small eccentricity to reduce magnification. It is also desirable to keep the edge of the ellipse at a collection angle of 120 or more degrees at low eccentricity to reduce the converging cone angle population. This indeed can be done. An elliptical curve can be designed where the back end starts at a lower eccentricity than the front end.

Figure 9:
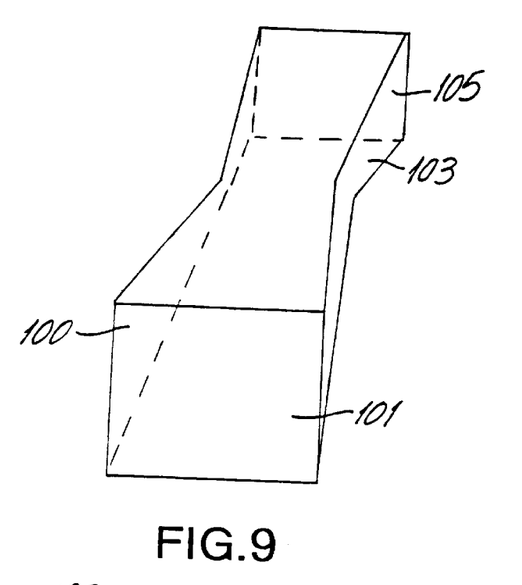
FIG. 9 is a perspective view of a double-tapered hollow LPI having a square entry pupil and a rectangular exit pupil.
Figure 10A:
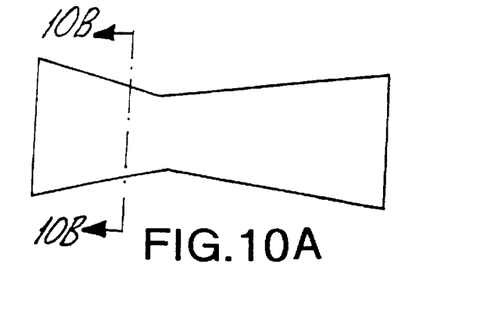
FIG. 10A is a side view and FIG. 10B is a cross-sectional view, along A—A of FIG. 10A, of a metal casing formed from the flat cold mirror coated sheet metal and forming the light pipe of FIG. 9 of the present invention.
Figure 10B:
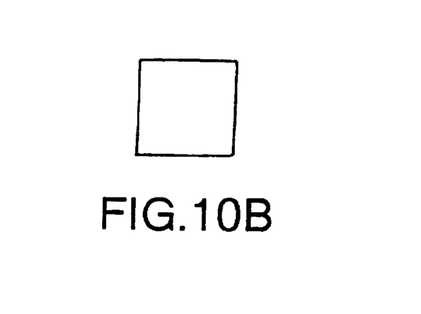

FIGS. 8 and 9 show the most preferred embodiment of the LPI. The entry section 100 starts with the entry pupil 101. The entry pupil is flat (cross-section perpendicular to optical axis 102) and is square or, alternatively, octagonal. This LPI is hollow and constructed from flat sheet metal with an internal cold mirror coating. The entry section is tapered in shape with the larger portion toward the light source (left in FIG. 8). The entry pupil area (cross-section) is in the range of 1.5:1 to 5:1 and most preferably in the range of 2:1 to 4:1 compared to the smallest area cross-section (perpendicular to axis 102) of the center section 103. The exit section 103 is integral with the exit section 104. In the embodiment of FIG. 7 the entry pupil profile is flat and square (28 mm×28 mm) or octagonal and, if octagonal, the entry section transitions to a square flat which is connected to the center section. The entry section is 21 mm long. This embodiment is made of two pieces. At their connection they are both square (14 mm×14 mm). The second taper (center section and exit section) is 85 mm long and goes from square cross-section (14 mm×14 mm) to rectangular (24 mm×18 mm–30 mm diagonal) to match the aspect ratio of the image gate. Its total length is 106 mm. This is a "V-BLOCK" (TM) LPI.

Preferably, as shown in FIG. 9, the flat sheets 130 are metal with a cold mirror coating. The metal is 1–5 mm thick and forms a sheet metal case 131. The case has the same shape as the V-BLOCK light pipe and acts as a heat sink. It may be cooled, if required, by a fan. If a glass substrate is used, the sheets may be adhered to a metal casing or otherwise secured therein. If one takes heat out, via a cold-mirror coating on the reflector, the huge variation in angle of incidence results in losses of visible light. Of course, that is also possible in the V-block LPI, but the angles are not as bad.

It is believed that as much as 95% of the heat of the beam may be removed by passing through the cold mirror coating and into the metal substrate. The metal substrate may be sheet metal with fins and may be die cast, also with fins. If the lamp is small the heat may be removed by convection air, for example, through holes in the bottom and top of the projector casing. The metal substrate of the LPI acts as a heat sink and permits novel forms of projector cooling to avoid noise, weight and unreliability of a conventional cooling fan. In one embodiment, the metal LPI casing is cooled by thermoelectric cooling, e.g., Peltier effect, using a solid state semiconductor N and P junction, see U.S. Pat. No. 5,724,818, incorporated by reference. Such solid-state thermoelectric cooling is not suitable for a battery operated projector, due to its electrical inefficiency. However, it may be used with a plug-in (household current) projector. The heat from the opposite end of the Peltier effect electrocouples may be removed by a heat sink, i.e., a metal plate with fins, or by convection air or by a fan.

The reflector-collector 106 is of the double ellipse type ("VAREX" reflector), described previously, in which the lamp's primary focal points $F_1$ and $F_2$ are directed to the secondary focal points $F_1'$ and $F_2'$; $E_1$ and $E_2$ are elliptical curves with the eccentricity of $E_2$ greater than the eccentricity of $E_1$, i.e., $E_1$=0.710 and $E_2$=0.730 and the radius of the reflector goes from 9.0 to 52.3 mm using an OSRAM 404 lamp. When the VAREX reflector is used with the FIG. 8 embodiment ("V-BLOCK") all rays over 6° will have at least one reflection. Typically, the lowest angles are 6–8°. An extra straight square mixing section (center section) between the two tapers may be used for additional mixing, if needed.

Figure 11:
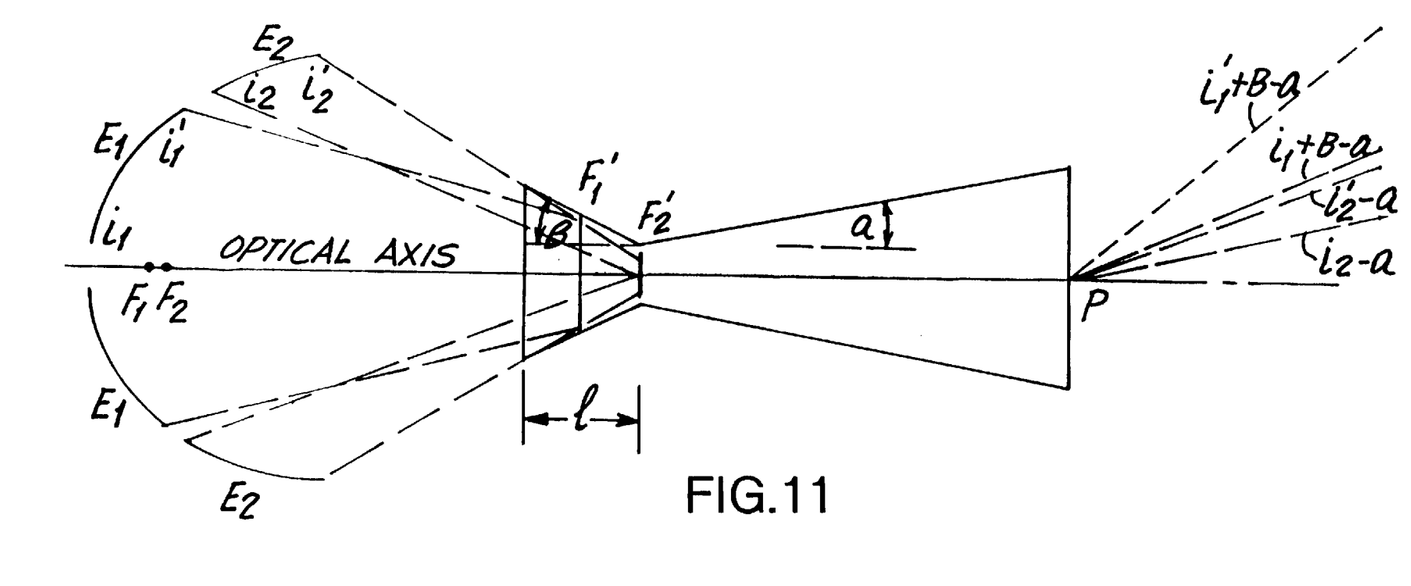
FIG. 11 is a side cross-sectional view of a compound collector optic (reflector) and a double tapered hollow LPI.

FIG. 11 depicts schematically a compound collector optic characterized by two elliptical zones E1 and E2. Each zone E1, E2 has a different eccentricity e from the other zone, where [e1] [e2], preferably smaller by an increment of 0.04 to 0.07. The elliptical zones E1 and E2 have slightly different primary focal points, on the order of 0.5 to 2 mm apart. The beam from the E1 zone (segment) is focused at secondary focal plane F1' and the beam from the E2 zone (segment) is focused at the secondary focal point F2'. For simplicity of demonstration and discussion, we assume that the cross-section vertical to the optical axis of the light pipe cone and taper are circular. The same technical arguments apply to square or rectangular light pipe cross-sections. It is also assumed that the interior surfaces of the compound collector optic and the light pipe are highly and specularly reflective.

Figure 12:
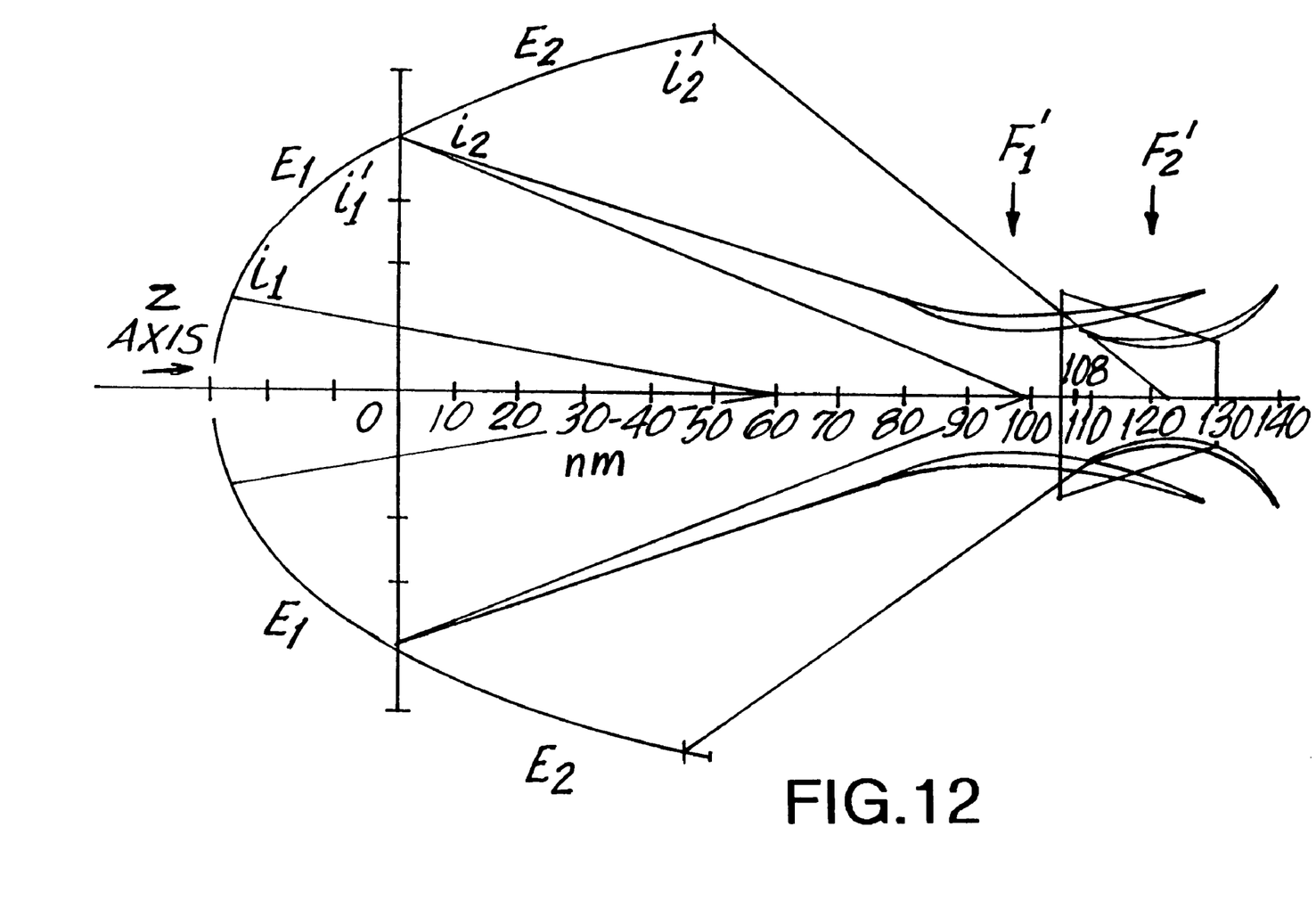
FIG. 12 is a side cross-sectional view of a compound collector optics (reflector) and the entry section of a hollow tapered LPI.

As shown in FIG. 12, the light beam 120 (LB2) is generated by the elliptical zone E2. The angles at which the extreme rays of this beam cross the optical axis are the angles of incidence i2 and i2'. LB2 does not intersect the surface of the entry cone section of the light pipe. As LB2 is reflected from the walls of the taper section of the light pipe the cone angles of the beam are reduced by the angle a to first order. From point P a cone of light is depicted which originated from segment E2 of the collection optic. The extreme cone angles defining this beam are i2–a and i2'–a.

The light beam 121 (LB1) is generated by the elliptical segment E1. Part of LB1 is intercepted by the light pipe cone section and part is at low enough angles that it passes through the light pipe without being intercepted. The angles at which the extreme rays of beam LB1 cross the optical axis are the angles of incidence i1 and i1'. The angle of the rays from LB1 that strike the cone are increased by angle b and when these same rays intercept the taper section the angles are increased by angle a. From point B, at the exit plane of the light pipe, to first order, the cone of the beam formed by the E1 segment of the elliptical compound collector optic is contained within the angles i1+b−a and i1'+b−a.

It is highly desirable for the purposes of the application of this type of light to projection systems that the cone angles of the two beams from segments E1 and E2 substantially overlap. An adjustment of the extent of overlap will determine the distribution of light on a projection screen. The design requirement to accomplish this result is that the angle i2'−a be approximately equal to the angle i1+b−a.

For best results in light collection and throughput the diagonal of the taper section entrance pupil of the LPI should be larger, or equal, to the size of the spot generated by LB2 at F2'. The entrance diagonal of the cone section (entry section) of the light pipe should be larger, or equal, to the size of the spot generated by LB1 at F1'. The size of these spots are directly related to the eccentricities chosen for the two elliptical segments E1 and E2.

FIG. 12 shows a computer derived simulation of the LB1 and LB2 configurations for a particular application. A compound collector reflector optic is used with e1=0.700 and e2=0.740, these being the eccentricities of the elliptical zones E1 and E2 respectively. A metal halide lamp (Osram HT1404) is used with a 3 mm arc gap. The location of the cone (entry section 122 of the LPI) is graphically shown on this figure. A number of design considerations apply. (a) The entrance to the cone (entry pupil) needs to be large enough to accept the entire LB1 spot. (B) The exit of the cone is the same size as the entrance of the taper section of the light pipe integrator must be large enough to accept the LB2 spot. (c) The exit of the cone section should be as small as possible, within criterion (b), so as to maintain the highest possible ratio between the area of the entrance to the taper and the exit of the taper. The ratio of these areas determines the reduction in the cone angle of both the light beams. The preferred dimensions are as follows:

Cone (Entry Section of FIG. 8)—entry pupil 30 mm×30 mm square; exit of entry section (start of center section—taper) 16 mm×16 mm; length 25 mm:

Center Section and Exit Section (FIG. 8), i.e., exit taper pupil 16 mm×16 mm square, exit pupil 28 mm×21 mm, Center and Exit sections (taper) 100 mm long.

In this example i2'=38 degrees and i1−21 degrees, angle b=18 degrees and a=7 degrees. This leads to i2'−a=31 degrees and i1+b−a=31 degrees and i1'+b−a=29 degrees. The cone section of the light pipe has been designed so that LB1 and LB2, as they exit from the end of the light pipe from point B, substantially overlap. In order to achieve this goal, the separation between F1' and F2' need to be in the range of 10 to 40 mm. Note that the entrance to the cone section also must clear the path of LB2. The major design goals for a preferred light pipe cone are: (a) to collect all of LB1 and LB2, (b) to accept LB2 without any reflections (beam interception) within the cone section. (c) to accept the entire LB2 directly into the taper section of the light pipe. (d) to achieve a ratio of light pipe taper section areas (entry/exit) of X 1.5 minimum, X 2.5 desirable, and 4.0 maximum, and (e) to ensure that the beams LB1 and LB2 substantially overlap at the exit of the light pipe taper section.

Collector optics are positioned with the lamp located on the optical axis. Such optical elements can be simple elliptical surfaces, but preferably are compound elliptical surfaces (that is, made of variable eccentricities and focal points). However, there are other approaches to designing the collector optic element which can meet the requirements imposed by the LPI element and the cone angle population set by the projection system. One such approach is to design a faceted reflector where each facet is directing the local rays in the proper direction towards the LPI element. Another approach involves the use of a combination of compound and faceted designs. For example, the preferred compound designs described above could be further improved by using a faceted approach rather than smooth curves. Such designs can be generated by computer programs and fabricated by glass molding techniques, similar to the way automobile headlights are made.

What is claimed is:

1. A light engine for an optical projector system comprising:

lamp means to generate light;

collector means to collect and direct the generated light; and a light pipe having an entrance pupil, a central section, an exit pupil along a straight optical axis, and reflecting walls; characterized in that the light pipe is hollow, and with internal walls, the light pipe is double tapered with the exit pupil being rectangular and the area of the entrance pupil being at least 50% larger than a cross-sectional area perpendicular to the optical axis of the center section, and a cold mirror coating is coated on the internal walls.

2. A projector system comprising:

lamp means to generate light;

collector means to gather and re-direct the generated light;

a light pipe having an entrance pupil, an exit pupil, a center section, internal walls and an optical axis, the light from the collector means being directed on the entrance pupil;

an image forming means to form an image and having an image gate, the exit pupil directing light on the image gate; and a projector lens; wherein the light pipe is hollow in shape, the internal walls are mirrors, the internal walls are open to ambient air; and wherein the mirrors comprise cold mirror means to reflect visible light and transmit infra-red light.

3. A projector system as in claim 2 wherein in at least some of the cross-sections perpendicular to the optical axis of the internal walls form a rectangle.

4. A projector as in claim 2 wherein in a cross-section perpendicular to the optical axis at the entrance pupil the internal walls form a square.

5. A projector system as in claim 2 wherein in all the cross-sections perpendicular to the optical axis the internal walls form a rectangle.

6. A projector system as in claim 2 wherein in a cross-section perpendicular to the optical axis at the exit pupil the internal walls form a rectangle.

7. A projector system as in claim 2 wherein the internal walls are of sheet metal and are flat.

8. A projector system comprising:

lamp means to generate light;

a reflector to gather and re-direct the generated light;

a light pipe having an entrance pupil, an exit pupil, a center section, internal walls and an optical axis, the light from the reflector being directed on the entrance pupil;

an image forming means to form an image and having an image gate, the exit pupil directing the light on the image gate; and a projector lens;

wherein the light pipe is hollow in shape, the internal walls are mirrors, the internal walls are open to ambient air; and wherein the reflector is curved and concave in shape in cross-sections through the axis, and the curvature comprises at least two ellipses having different eccentricities and both eccentricities are in the range of 0.60–0.90.

9. A projector system comprising:

(a) a metal halide arc lamp having an arc gap in the range of 1–6 mm;

(b) a reflector having a central axis; the lamp arc gap being along the reflector's axis;

the reflector being circular in cross-sections perpendicular to the central axis and being curved in at least two elliptical curves having different eccentricities in cross-sections through the central axis;

(c) a hollow light pipe having an entrance pupil, a rectangular exit pupil, a center section between the entrance and exit pupils, an optical axis, flat reflecting walls made of metal, and a tapered shape in which the exit pupil is at least 50% larger than the area of a cross-section through the center section taken perpendicular to the optical axis;

(d) a cold mirror coating means on the reflecting walls to reflect visible light and to transmit visible light;

(e) an LCD (Liquid Crystal Display) panel illuminated by light from the exit pupil; and (f) a projector lens means to project images formed by the LCD panel onto a screen.

10. A projector system as in claim 9 wherein the elliptical curves each have a different focal point.

11. A projector system as in claim 9 wherein each of the elliptical curves are formed around the same apex point.

12. An elongated light pipe having an optical axis, an entrance pupil and an exit pupil, for use in a projector system, characterized in that:

(a) the light pipe is hollow and has internal mirror walls and is not filled with a dielectric;

(b) the mirror walls are flat and of metal;

(c) a cold mirror coating means is coated on the mirror walls to reflect visible light and transmit infra-red light.

13. A light pipe as in claim 12 wherein the entrance pupil is square or octagonal and the exit pupil is rectangular in a cross-section perpendicular to the optical axis.

14. A light pipe as in claim 12 wherein the light pipe is a tapered shape and in which the exit pupil is at least 50% larger than the area of a cross-section through the center section taken perpendicular to the optical axis.

15. A light engine for an optical projector system comprising:

(a) lamp means to generate light;

(b) a reflector which is circular in cross-sections perpendicular to a central axis and having first and second curved sectors, the sectors in profile having two different curvatures, the reflector producing a first beam from the first reflector sector and a second beam from the second reflector sector, each beam having a free end focus spot;

(c) a hollow light pipe integrator having a tapered entry section with an entry pupil, a central section, an exit pupil and internal mirror walls, a cross-section of the entry pupil being at least 50% larger in area than a cross-section of the center section; and (d) reflector means to focus the first beam so that it does not reflect from the walls of the entry section and its free end spot is within the entry section.

16. A light engine as in claim 15 wherein the curvatures of the first and second reflector sectors are ellipses.

17. A light engine as in claim 15 wherein the light pipe integrator comprises metal walls having an internal cold mirror coating.

18. A light engine as in claim 15 and second reflector means to focus the second beam so that its free end focus spot is within the center section.

19. A light engine for an optical projector system comprising:

(a) lamp means to generate light;

(b) a reflector which is circular in cross-sections perpendicular to a central axis and having first and second curved sectors, the sectors in profile having two different curvatures, the reflector producing a first beam from the first reflector sector and a second beam from the second reflector sector, each beam having a free end focus spot;

(c) a hollow light pipe aligned in sequence along an optical axis, a tapered entry section having an entry pupil and an exit pupil and internal mirror walls, the entry pupil being at least 50% larger in area than the section exit pupil; and (d) reflector means to focus the first beam and second beam to substantially overlap at the exit pupil.

20. A light engine as in claim 19 wherein the curvatures of the first and second sectors are ellipses.

21. A light engine as in claim 19 wherein the light pipe comprises metal walls having an internal cold mirror coating.

22. A light engine for an optical projector system comprising:

(a) lamp means to generate light;

(b) a reflector which is circular in cross-sections perpendicular to a central axis and having first and second curved sectors, the sectors in profile having two different curvatures, the reflector producing a first beam from the first reflector sector and a second beam from the second reflector sector, each beam having a free end focus spot;

(c) a hollow light pipe integrator having a tapered entry section with an entry pupil, a central section, an exit pupil and internal mirror walls, a cross-section of the entry pupil being at least 50% larger than a cross-section of the center section; and (d) the free end focus spot of the first beam being focus point F1 and the free end focus spot of the second beam being focus point F2 which is separated from F1 in the range of 10–40 mm.

23. A light engine as in claim 22 wherein the curvatures of the first and second reflector sectors are ellipses.

24. A light engine as in claim 22 wherein the light pipe integrator comprises metal walls having an internal cold mirror coating.

* * * * *